United States Patent
Janko et al.

[11] Patent Number: 5,818,520
[45] Date of Patent: Oct. 6, 1998

[54] PROGRAMMABLE INSTRUMENT FOR AUTOMATIC MEASUREMENT OF COMPRESSED VIDEO QUALITY

[75] Inventors: Bozidar Janko, Portland; David K. Fibush, Beaverton, both of Oreg.

[73] Assignee: Tektronix, Inc., Wilsonville, Oreg.

[21] Appl. No.: 605,241

[22] Filed: Feb. 12, 1996

[51] Int. Cl.$^6$ .................................................. H04N 17/00
[52] U.S. Cl. .......................... 348/192; 348/181; 348/189
[58] Field of Search ................................. 348/180, 181, 348/189, 192, 518, 519, 553, 564, 563, 461, 193; H04N 17/00, 17/06

[56] References Cited

U.S. PATENT DOCUMENTS

| | | | |
|---|---|---|---|
| 4,368,486 | 1/1983 | Degoulet et al. | 348/461 |
| 5,208,666 | 5/1993 | Elkind et al. | 348/192 |
| 5,214,508 | 5/1993 | Stevens | 348/181 |
| 5,446,492 | 8/1995 | Wolf et al. | 348/192 |
| 5,504,931 | 4/1996 | Furtek | 348/518 |
| 5,574,500 | 11/1996 | Hamada et al. | 348/180 |

*Primary Examiner*—John K. Peng
*Assistant Examiner*—Jeffrey S. Murrell
*Attorney, Agent, or Firm*—Francis I. Gray

[57] ABSTRACT

A method of automatic measurement of compressed video quality superimposes special markings in the active video region of a subset of contiguous frames within a test video sequence. The special markings provide a temporal reference, a spatial reference, a gain/level reference, a measurement code, a test sequence identifier and/or a prior measurement value. The temporal reference is used by a programmable instrument to extract a processed frame from the test video sequence after compression encoding-decoding which is temporally aligned with a reference frame from the test video sequence. The spatial reference is used by the programmable instrument to spatially align the processed frame to the reference frame. The measurement code is used by the programmable instrument to select the appropriate measurement protocol from among a plurality of measurement protocols. In this way video quality measures for a compression encoding-decoding system are determined automatically as a function of the special markings within the test video sequence.

9 Claims, 3 Drawing Sheets

PROGRAMMABLE INSTRUMENT FOR AUTOMATIC MEASUREMENT OF COMPRESSED VIDEO QUALITY

BACKGROUND OF THE INVENTION

The present invention relates to the measurement of video signals, and more particularly to a programmable instrument for automatic measurement of compressed video quality.

Conventional measurement of video signals has occurred in the analog, broadband domain using conventional waveform monitors and vectorscopes. As video signals have moved into the digital domain, using serial digital formats, the digital signals have conventionally been converted into the analog, broadband domain for typical video measurement, while additional digital techniques have been developed to measure the validity of the digital video data stream. Now video signals are being compressed for transmission over lower bandwidth transmission media, and then decompressed at a receiver for display. This places additional requirements on the measurement of video signals since an Important aspect of compression/decompression techniques is to assure a controlled level of picture quality degradation event, i.e., the decompressed video signal presents the expected quality of display related to the video signal prior to compression.

Currently the industry is addressing this issue, and the method being proposed is to acquire relatively long video sequences and perform correlation analysis to align test sequence frames within the video signal. The implementation of such a procedure is very expensive, both in the cost of equipment and in reduced performance since the procedure is relatively slow.

What is desired is a simple technique for automatic measurement of compressed video quality that operates relatively quickly while being relatively low in cost.

SUMMARY OF THE INVENTION

Accordingly the present invention provides a method of automatic measurement of compressed video quality that identifies particular video frames to be measured after compression-decompression as well as conveying information about what type of test to make on the identified video frames. A video test sequence includes a subset of contiguous frames that include superimposed special markings in the active video portion of the frames. The special markings include both temporal as well as spatial references, and may be coded to include an identification of the video test sequence, an identification of the video quality measurement to be made, and/or a prior measurement for comparison with the current measurement to be made. Reference frames from the input video test sequence or an identical source are extracted for comparison with processed frames from the video test sequence after having been subjected to compression encoding-decoding. The processed frames are extracted as a function of the temporal references in the special markings to correspond to the reference frames. The spatial references within the special markings are used to assure that the reference and processed frames are aligned, and also that they are amplified by the same amount so that corresponding pixels from the respective frames are compared during the video quality measurements.

The objects, advantages and other novel features of the present invention are apparent from the following detailed description when read in conjunction with the appended claims and attached drawing.

DESCRIPTION OF THE PREFERRED EMBODIMENT

Figure 1:
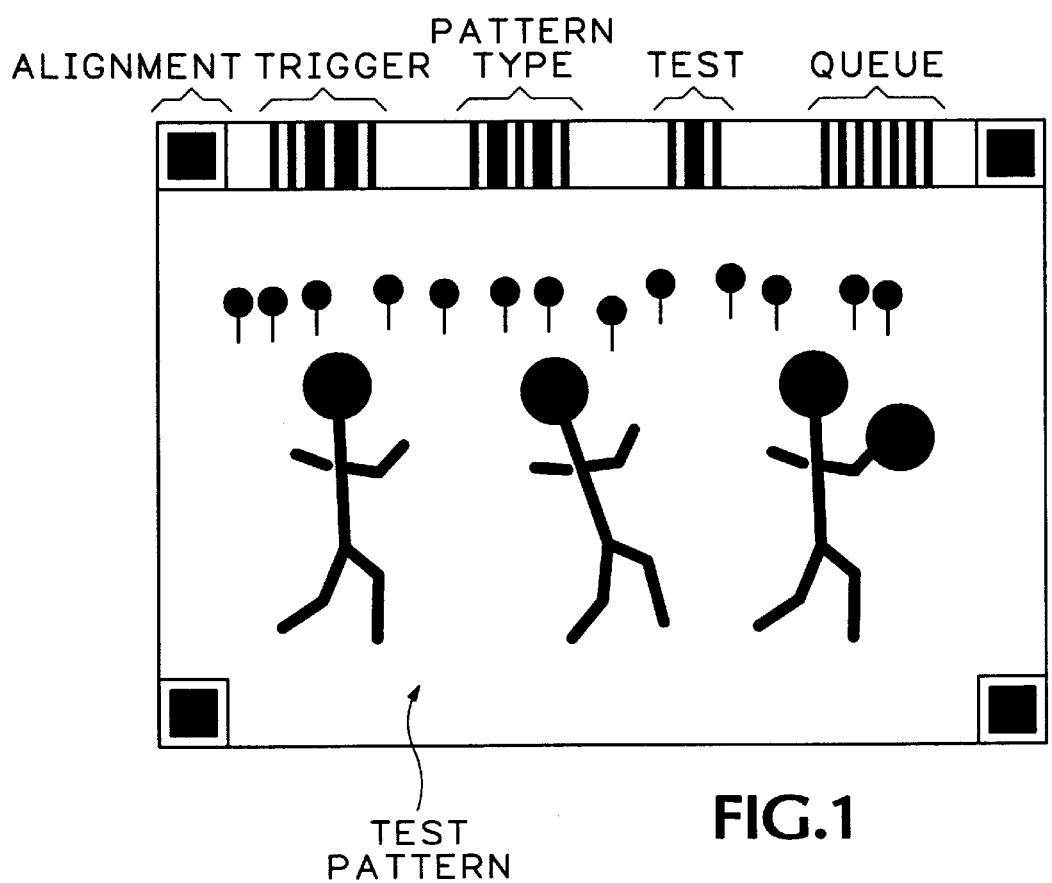
FIG. 1 is a plan view display of an illustrative test pattern for automatic measurement of compressed video quality according to the present invention.

The automatic measurement of compressed video quality is based on specially prepared video test sequences, either natural or artificial. A subset of contiguous frames within the test sequences have superimposed special markings on their active video fields to provide both spatial and temporal references. One such example is shown in FIG. 1. One purpose of these markings is to allow the instrument to automatically identify and capture at least one video frame, and preferrably more, from the test sequence as a reference frame. A corresponding processed frame, or frames, is captured after the video signal has undergone compression encoding-decoding, providing time alignment of the processed frame with the reference frame. The processed frame also is aligned spatially with the reference frame using the spatial references from the special markings. Then the processed frame is compared with the reference frame. Video quality measures are extracted from the comparison according to the desired measurement protocol. The measurements are programmable by virtue of codes included within the superimposed markings which direct the instrument to access particular measurement protocols to extract particular measures.

The markings shown in FIG. 1 are superimposed onto the visible portion of the video test sequence and are designed so that they can survive the video compression encoding-decoding cycle, although some loss of some of the marked frames may be tolerated. The content of the special markings is designed so that the instrument automatically recognizes the marked frames, identifies the type of test sequence and the type of measurement desired, and performs queuing so that one or more unique frames in the test sequence may be identified for capturing. Other spatial features are contained in the special markings, such as alignment marks and intensity test zones, to make it easier for the instrument to do registration and gain/level compensation needed as part of the measurement suite to assure that the pixels of the processed frames are compared with the corresponding pixels of the reference frame at the same intensity levels. Optionally other information contained in the special markings may include the values of previous measurements from the test sequence, to be used for comparison to determine system degradation over time, for example.

Figure 2:
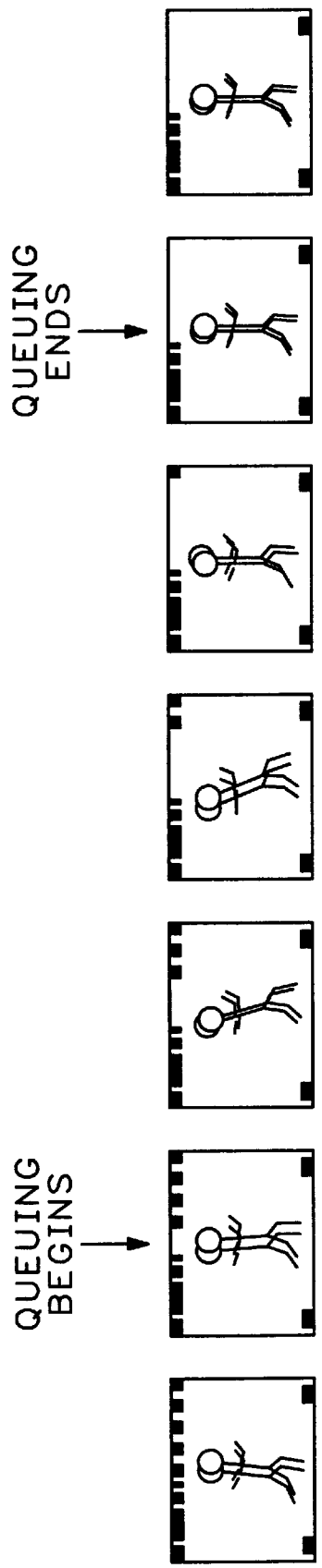
FIG. 2 is a plan view display of a sequence of test patterns illustrative of queuing for automatic measurement of compressed video quality according to the present invention.

Key features of the special markings are designed to survive the encoding-decoding process, such as MPEG compression, and, in this example, include a band along the top of the active video area of the video signal having a sequence of lighter and darker zones which represent binary-encoded information, like a bar code. These zones are relatively large so as to avoid being obscured by codec artifacts which might arise during the compression-transport-decompression cycle. In the case of MPEG encoding, a good height for the markings may be one macroblock, i.e., 16 lines, along the top to avoid the pattern being subjected to motion vector translations during MPEG encoding. The band along the top includes a trigger code identifying a starting point for a marked subset within the video test sequence, a code identifying the test pattern, a code identifying the measure to be extracted from the test pattern, and a queuing pattern. The queuing pattern changes incrementally with each frame, and may be in the form of a Gray code that counts down to zero over successive frames, as shown in FIG. 2. Thus the instrument which reads the queuing pattern can extrapolate and find the frame where the queuing pattern ends, even in cases where several frames are lost because of coding and transmission errors.

Also as shown in FIG. 1 there may be four rectangular zones, one in each corner of the frame. The central areas in these zones have one brightness level, while the surrounding area has another, such as 75% and 25% of maximum luminance, respectively. The four zones are spatial references that are constant from frame to frame, and which are designed to facilitate the automatic registration and gain/level adjustment of the processed frames with the reference frames.

The instrument monitors the processed video signal, typically arriving decoded in a serial digital component video format. When the trigger code pattern presence is recognized, the instrument begins to monitor the queuing pattern and starts the extrapolation process. The result of this process is to identify uniquely a particular frame of the sequence. The identified frame and the one or more immediately following are captured into the instrument memory for further processing. The measurement of objective video parameters uses a variety of test sequences, either natural or artificial, each designed to test compression codecs for a given type of behavior. Since codec behavior is video-content sensitive, the test sequence is played through the codec for some time before an artifact is provoked. So the special markings and the queuing pattern are located at the appropriate location within the video test sequence, identifying the marked subset within the video test sequence.

Figure 3:
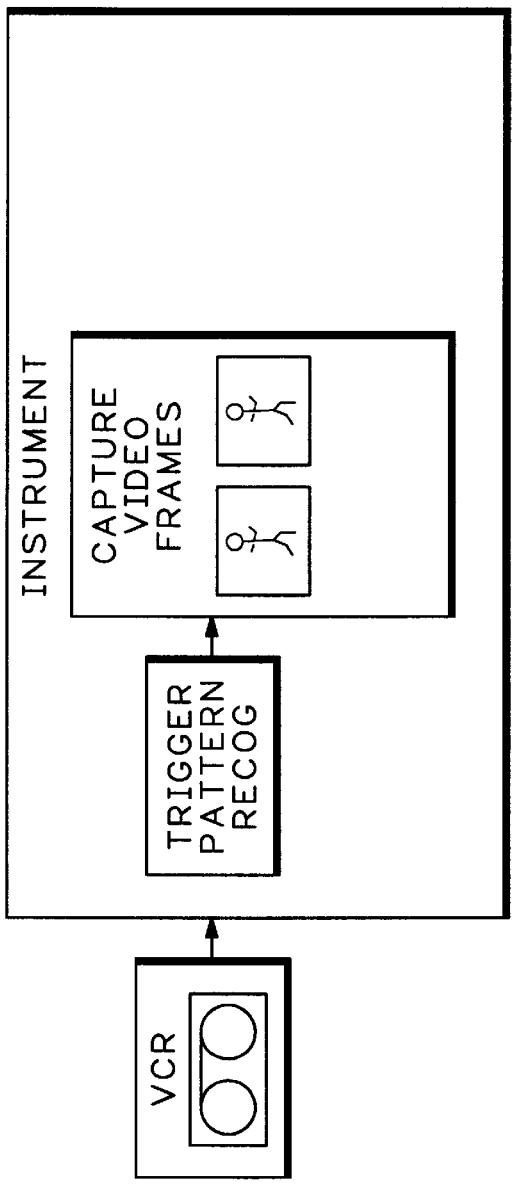
FIG. 3 is a block diagram view of a system for capturing reference video frames from the test pattern for the programmable instrument according to the present invention.
Figure 4:
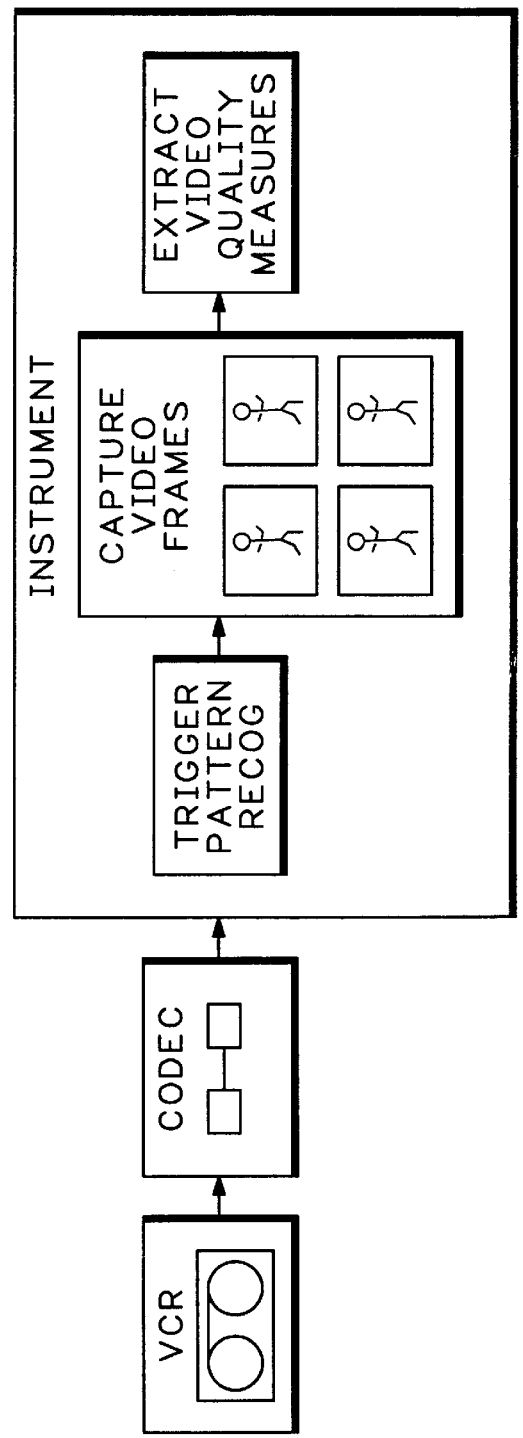
FIG. 4 is a block diagram view of the system for capturing processed video frames for comparison against the reference video frames by the programmable instrument according to the present invention.

One method for performing the measurement is to play the video test sequence with the special markings from a video source, such as a video cassette recorder, a disk recorder, or the like, and to input the video test sequence to the instrument as shown in FIG. 3. The instrument monitors the video signal from the video source and automatically captures at least one video frame designated by the special markings as a reference frame. Then as shown in FIG. 4 the same video signal is transmitted through the compression codec, and possibly through a communication link, before being input to the instrument. Again the instrument recognizes the special markings in the processed video signal and captures at least one video frame as the processed frame that correspond to the reference frame. With corresponding reference and processed video frames the instrument now extracts video quality measures, using the ANSI standard for objective video measurement developed by NTIA, the Just Noticeable Difference (JND) algorithm developed at Sarnoff, or the like. The instrument may also capture and analyze video frames from several test sequences played in succession, providing automatic and programmable capability.

Alternatively the reference frames may be transported as ancillary data at low duty cycle, or via alternate channels, such as the Internet, or be recorded onto a portable memory device, such as a CD-ROM or the like, for transport to the instrument at the receiving end of the compression-transmission-decompression system. The requirement is that reference frames from the video test sequence, however transported to the instrument, are compared for measurement with corresponding processed frames from the video test sequence.

Thus the present invention provides a programmable instrument for automatic measurement of compressed video quality that compares particular frames (reference frames) of an uncompressed video test sequence with corresponding frames (processed frames) of the compressed video test sequence, using special marks in the visible area of the video signal that survive the compression process, which special marks are recognized by the instrument and used to identify and capture the processed video frames time aligned with the reference frames, as well as to determine what video quality measurement is to be performed on the frames.

What is claimed is:

1. A method of automatic measurement of compressed video quality comprising the steps of:

generating at least one reference frame with superimposed special markings in the active video portion of the at least one reference frame, the special markings including a temporal reference that identifies the at least one reference frame within an input video signal;

extracting from a processed version of the input video signal at least one processed frame as a function of the temporal reference within the special markings, which at least one processed frame is temporally aligned with the at least one reference frame; and performing video quality measurements upon the at least one processed frame against the at least one reference frame as a function of a desired measurement protocol.

2. The method as recited in claim 1 wherein the special markings include a spatial reference further comprising the step of spatially aligning the processed frame to the reference frame as a function of the spatial reference prior to the performing step.

3. A method of automatic measurement of compressed video quality comprising the steps of:

generating a test video sequence having a subset of contiguous frames with superimposed special markings in the active video portion of the frames, the special markings including a spatial reference;

spatially aligning a processed frame from a processed version of the processed test video sequence with a corresponding reference frame from the test video sequence;

performing video quality measurements upon the processed frame against the reference frame.

4. The method as recited in claims 1, 2 or 3 wherein the special markings include a gain/level reference further comprising the step of adjusting the level of the processed frame relative to the reference frame as a function of the gain/level reference.

5. The method as recited in claim 4 wherein the special markings include a measurement code further comprising the step of selecting the desired measurement protocol from among a plurality of measurement protocols as a function of the measurement code prior to the performing step.

6. A programmable instrument for automatic measurement of compressed video quality comprising:

means for extracting from a processed test video sequence a processed frame temporally aligned with a reference frame from an unprocessed test video sequence, the processed frame being identified as a function of a temporal reference within special markings superimposed over the active video of a subset of contiguous frames of the unprocessed test video sequence; and means for analyzing the processed frame against the reference frame to extract video quality measures as a function of a desired measurement protocol.

7. The programmable instrument as recited in claim 6 further comprising means for spatially aligning the processed frame with the reference frame as a function of a spatial reference within the special markings prior to input to the analyzing means.

8. The programmable instrument as recited in claim 7 further comprising means for selecting the desired measurement protocol from among a plurality of measurement protocols as a function of a measurement code within the special markings for the analyzing means.

9. The programmable instrument as recited in claims 6, 7 or 8 further comprising means for adjusting the level of the processed frame as a function of a gain/level reference within the special markings prior to the analyzing means.

\* \* \* \* \*